United States Patent
Bharadwaj et al.

(10) Patent No.: US 9,418,650 B2
(45) Date of Patent: Aug. 16, 2016

(54) TRAINING SPEECH RECOGNITION USING CAPTIONS

(71) Applicant: Verizon Patent and Licensing Inc., Basking Ridge, NJ (US)

(72) Inventors: Sujeeth S. Bharadwaj, Chicago, IL (US); Suri B. Medapati, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 14/037,144

(22) Filed: Sep. 25, 2013

(65) Prior Publication Data

US 2015/0088508 A1     Mar. 26, 2015

(51) Int. Cl.
  G10L 15/00  (2013.01)
  G10L 15/10  (2006.01)
  G10L 15/06  (2013.01)

(52) U.S. Cl.
  CPC ..................... *G10L 15/063* (2013.01)

(58) Field of Classification Search
  CPC ....... H05K 999/99; G10L 15/10; G10L 15/00
  See application file for complete search history.

(56) References Cited

U.S. PATENT DOCUMENTS

| | | | |
|---|---|---|---|
| 6,324,509 B1 * | 11/2001 | Bi et al. ........................ | 704/248 |
| 6,363,380 B1 * | 3/2002 | Dimitrova ......... | G06F 17/30787 707/740 |
| 6,754,631 B1 * | 6/2004 | Din .......................... | G10L 17/00 704/270 |
| 8,131,545 B1 * | 3/2012 | Moreno et al. ................. | 704/235 |
| 2003/0086409 A1 * | 5/2003 | Karas ................ | G06F 17/30855 370/350 |
| 2003/0088397 A1 * | 5/2003 | Karas ................ | G06F 17/30017 704/1 |
| 2003/0117428 A1 * | 6/2003 | Li ...................... | G06F 17/30787 715/716 |
| 2006/0184800 A1 * | 8/2006 | Rosenberg ..................... | 713/186 |
| 2006/0293886 A1 * | 12/2006 | Odell ...................... | G10L 15/08 704/231 |
| 2007/0143103 A1 * | 6/2007 | Asthana ................ | H04M 3/567 704/200 |
| 2009/0037179 A1 * | 2/2009 | Liu et al. ....................... | 704/260 |
| 2009/0265639 A1 * | 10/2009 | Shuster ......................... | 715/747 |
| 2010/0305945 A1 * | 12/2010 | Krishnaswamy ....... | G10L 17/00 704/235 |
| 2010/0318355 A1 * | 12/2010 | Li et al. ......................... | 704/244 |
| 2011/0078637 A1 * | 3/2011 | Inderrieden et al. .......... | 715/866 |
| 2012/0140982 A1 * | 6/2012 | Sukegawa et al. ............ | 382/103 |

\* cited by examiner

*Primary Examiner* — Michael N Opsasnick
*Assistant Examiner* — Bryan Blankenagel

(57) ABSTRACT

In embodiments, apparatuses, methods and storage media are described that are associated with training adaptive speech recognition systems ("ASR") using audio and text obtained from captioned video. In various embodiments, the audio and caption may be aligned for identification, such as according to a start and end time associated with a caption, and the alignment may be adjusted to better fit audio to a given caption. In various embodiments, the aligned audio and caption may then be used for training if an error value associated with the audio and caption demonstrates that the audio and caption will aid in training the ASR. In various embodiments, filters may be used on audio and text prior to training. Such filters may be used to exclude potential training audio and text based on filter criteria. Other embodiments may be described and claimed.

25 Claims, 8 Drawing Sheets

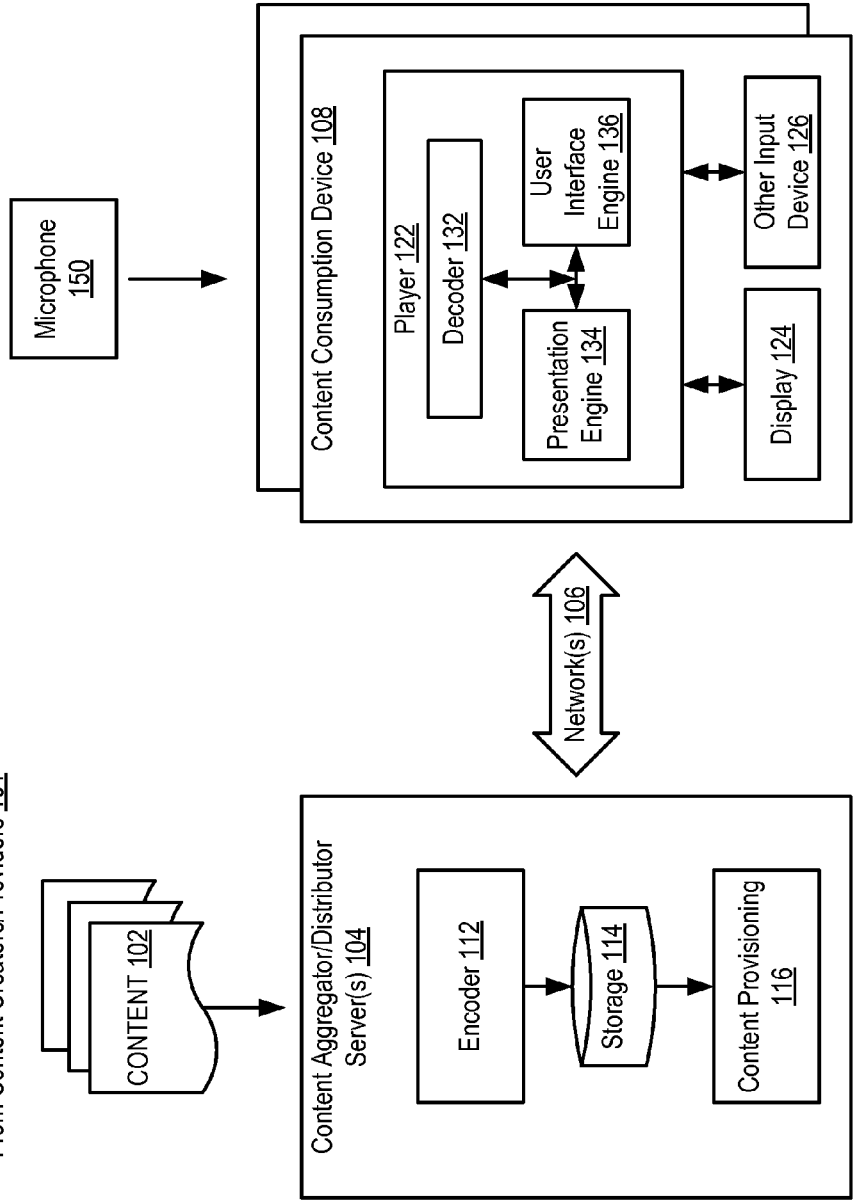
Fig. 1
(Replacement Sheet)

TRAINING SPEECH RECOGNITION USING CAPTIONS

TECHNICAL FIELD

The present disclosure relates to the field of data processing, in particular, to apparatuses, methods and systems associated with speech recognition.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Modern electronic devices, including devices for presentation of content, increasingly utilize speech recognition for control. For example, a user of a device may request a search for content or playback of stored or streamed content. However, many speech recognition solutions are not well-optimized for commands relating to content consumption. As such, existing techniques may make errors when analyzing speech received from a user. In particular, while existing techniques may utilize processes and systems that have been trained with real speech, these techniques may be trained using speech recorded in very clean conditions, such as scripted newscasts or speeches. However, these techniques may not be sufficiently robust to analyze speech that is made under non-ideal conditions. For example, existing techniques may not be trained on speech made in noisy environments, speech made by children, and/or accented speech. These techniques may exhibit errors when asked to recognize speech in such scenarios.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 1 illustrates an example arrangement for content distribution and consumption, in accordance with various embodiments.

DETAILED DESCRIPTION

Figure 2:
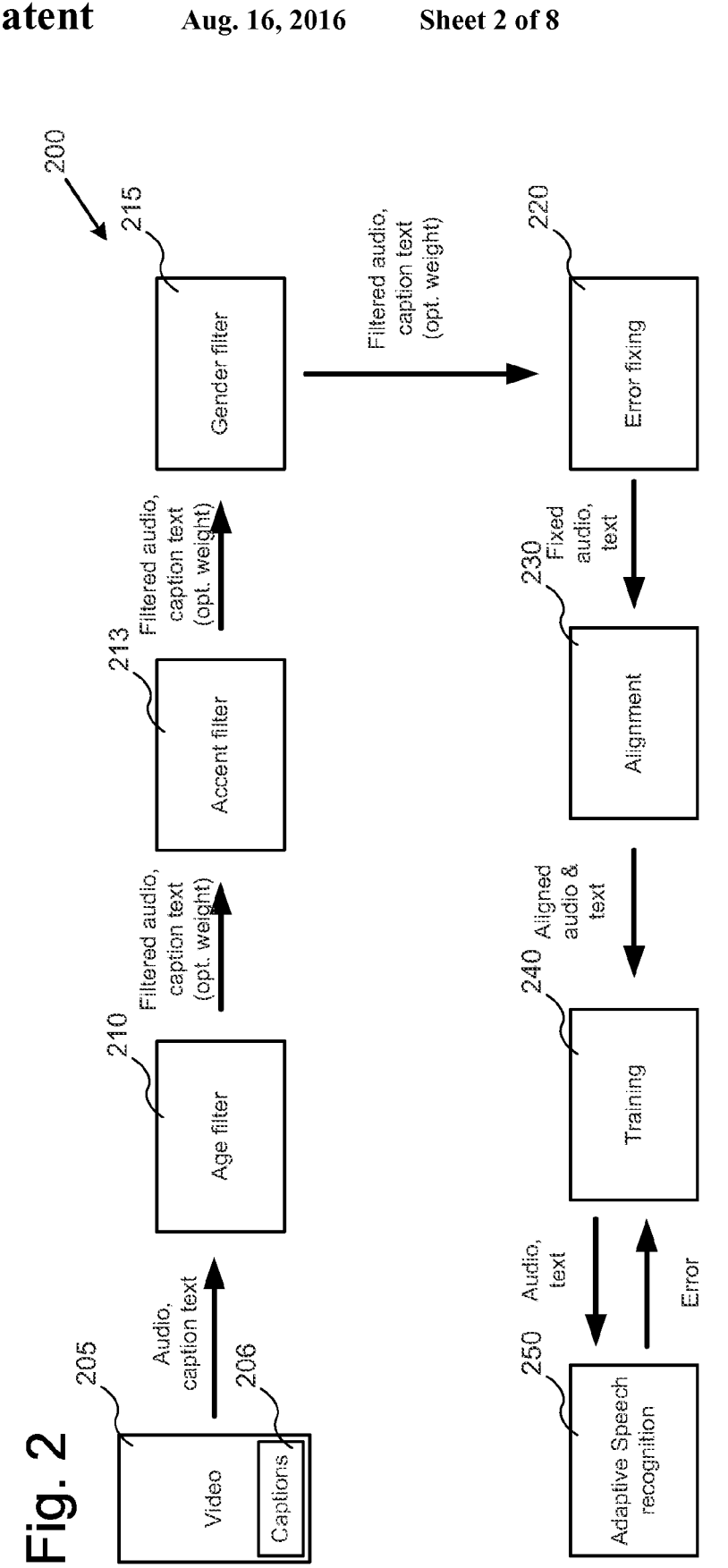
FIG. 2 illustrates an example arrangement for training an adaptive speech recognition system utilizing captioned video, in accordance with various embodiments.

Embodiments described herein are directed to, for example, methods, computer-readable media, and apparatuses associated with training adaptive speech recognition systems ("ASR") using audio and text obtained from captioned video, such as, for example, closed captioned television programming. In various embodiments, captioned video is used as a source for training ASR because such video may provide benefits over speech recorded using other techniques (such as newscasts or speeches). In one example, video with captioned speech occurs in a greater variety of contexts than do other, more specific, types of video. Additionally, video with captioned speech may include a wider variety of speakers, such as children and/or people with "accented" or other non-traditional speech. The use of such speech may provide for better-trained ASR, by allowing for ASR training that is better-tuned to particular types of speakers. Finally, video with captioned speech may include background noise, music, or other sounds that may not be found in existing training speech. Because much speech recognition may occur in noisy and/or musical environments, training with video with captioned speech may improve later performance of such-trained ASR.

In various embodiments, the ASR may be trained by a captioned speech ASR training system ("CST") which may be configured to identify audio and caption text and train an ASR using the identified audio and caption. In various embodiments, the audio and caption may be aligned for identification, such as according to a start and end time associated with a caption. In various embodiments, such an alignment may be adjusted to better fit audio to a given caption. In various embodiments, caption text and/or audio may be fixed or otherwise adjusted prior to alignment (and/or prior to training) to facilitate better training.

In various embodiments, training may be performed for fewer than all instances of aligned audio and caption text. In various embodiments, prior to training an ASR, the ASR may be utilized to recognize speech from the audio; this recognized speech may then be compared to caption text associated with the audio to determine an error value. The audio and caption may then be used for training if the error value demonstrates that the audio and caption will aid in training the ASR. For example, if the error value is too low, the ASR may be configured well for that particular example and the audio and caption may not provide sufficient additional training data for the ASR. In a contrasting example, if the error value is too high, the example provided by the audio and caption may not actually succeed in improving the performance of the ASR. In both examples, the audio and caption may be excluded from training the ASR.

In various embodiments, filters may be used on audio and text prior to training Such filters may be used to exclude potential training audio and text based on filter criteria. For example, a children's speech filter may exclude audio (and associated captions) for speech that is likely to be produced by adults. Audio and text allowed by the filter may then be used to train an ASR that is better equipped to recognize children's speech. In another example, a filter may be used to provide only accented speech (and associated caption text) for training an ASR that may later be used to recognized such-accented speech.

It may be recognized that, while particular embodiments are described herein with reference to identification of named entities in speech, in various embodiments, other language features may be utilized. For example, in various embodiments, nouns in speech may be identified in lieu of named entity identification. In other embodiments, only proper nouns may be identified and utilized for speech recognition.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement 100 for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106. In various embodiments, speech recognition training techniques described herein may be implemented in association with arrangement 100. In other embodiments, different arrangements, devices, and/or systems may be used.

In embodiments, as shown, content aggregator/distributor servers 104 may include encoder 112, storage 114 and content provisioning 116, which may be coupled to each other as shown. Encoder 112 may be configured to encode content 102 from various content creators and/or providers 101, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube® video, iReporter® video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and other user input device(s) 126. Player 122 may be configured to receive streamed content, decode and recover the content from the content stream, and present the recovered content on display 124, in response to user selections/inputs from user input device(s) 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

In various embodiments, in addition to other input device(s) 126, the content consumption device may also interact with a microphone 150. In various embodiments, the microphone may be configured to provide input audio signals, such as those received from a speech sample captured from a user. In various embodiments, the user interface engine 136 may be configured to perform speech recognition on the captured speech sample in order to identify one or more spoken words in the captured speech sample. In various embodiments, the user interface module 136 may be configured to perform speech recognition using one or more ASRs that may be trained according to techniques described herein.

Referring now to FIG. 2, an example arrangement 200 for training an adaptive speech recognition system 250 ("ASR 250") utilizing captioned video is illustrated in accordance with various embodiments. In various embodiments, the modules and activities described with reference to FIG. 2 may be implemented on a computing device, such as those described herein. While particular entities illustrated in FIG. 2 are illustrated as operating in a particular order, it may be recognized that, in various embodiments, the entities and processes illustrated may be re-ordered, and that particular activities may be omitted or split into plural activities.

In various embodiments, video 205 including captions 206 may be used as input to one or more processes for training the ASR 250. In various embodiments, the video 205 may include video content provided with associated closed caption text, such as broadcast television content, cable television content, video content provided via removable media (such as DVD or Blu-ray™), online video content, etc. In various embodiments, the captions 206 may include captions for spoken audio in the video 205. In various embodiments, captions 206 may include sub-titles. In various embodiments, multiple streams of captions 206 may be included or otherwise associated with a single stream of video 205. For example, a video 205 may be associated with captions or sub-titles in multiple languages. In some embodiments, additional information may be included with the captions 206, such as start and/or end times for various captions, language information, indications of persons speaking, and/or indications of noise, music, and/or other non-speech events (e.g., door slams, breaking glass, etc.) in the video 205.

In various embodiments, audio and caption text from the video 205 may be filtered before being used for training of the ASR 250. In various embodiments, filters may be utilized which exclude particular audio and associated caption text based on one or more filter criteria. For example, in some embodiments, one or more age filters 210 may be utilized to allow only audio and/or captions that are associated with particular ages, such as children. In some embodiments, one or more accent filters 213 may be utilized to allow only audio and/or captions that are associated with particular accented speech. In yet other embodiments, one or more gender filters 215 may be utilized to allow only audio and/or captions that are associated with a particular gender, such as by only allowing speech made by women. While these examples are particular examples of filters that may be utilized, in other embodiments, filters may operate using additional sources of information such as content metadata (e.g., content genre, media type, etc.) and/or features extracted from the video 205 itself (e.g., noise level).

In various embodiments, these filters may operate through analysis of the audio obtained from the video 205. For example, the age filter 210 may exclude spoken audio that falls below a particular frequency in order to exclude adult speech. In another example, the accent filter 213 may allow speech that includes (or excludes) particular phonetic features that are associated with particular accented speech. In yet another example, a noise filter (not illustrated) may allow speech that contains a desired level of background noise. In various embodiments, in addition to (or in lieu of) analysis of audio, the filters 210-215 may operate through analysis of caption text. For example, if a character is identified through caption text, that information may be utilized by a filter to exclude or specifically include speech audio that is contemporaneous with that caption. In yet other embodiments, metadata from the video itself may be analyzed, such as by allowing only audio and content text for certain types of video content. For example, a filter may be utilized that allows content of video genre that are assumed to have background noise similar to the context in which the ASR may be used after training, such as modern drama that are set in the home, in the case of an ASR used in a home-based content consumption device. In yet other embodiments, image data, such as from frames of the video 205, may be analyzed for filtering. For example, a filter may include one or more image processing tools that may be configured to analyze facial images in the video 205 and to allow content based on estimations of age, gender, ethnicity, etc., of one or more persons in the video 205.

In various embodiments, rather than excluding filtered audio and text, one or more filters may apply weighted filtering. In various embodiments, such filters may apply weights to audio and/or text based on satisfaction of filter criteria. These weights may be applied during training of the ASR 250. Thus, the filter may reduce the weight, and thus the influence, of a caption and audio that does not satisfy a filter criteria, and/or increase weight of caption and audio that does.

In various embodiments, the arrangement 200 may also include an error fixing module 220. This error fixing module 220 may be configured to fix errors found in the audio and/or caption text before performing training using the audio and caption text. In various embodiments, the error fixing module 220 may be configured to correct errors in caption text, such as misspellings, character deletions, character insertions, etc. In various embodiments, the error fixing module 220 may be configured to clean audio prior to training, such as by removing noise, or correcting compression artifacts.

In various embodiments, the arrangement 200 may include an alignment module 230. In various embodiments, the alignment module 230 may be configured to determine an alignment between audio and captions from the video 205 to determine a portion of audio that may be associated with a caption from the video 205. Thus, in various embodiments, the alignment module 230 may be configured to determine start times and end times for a portion of audio associated with a caption. In various embodiments, the alignment module 230 may be configured to adjust an initial start and end time based on a determination of a confidence value, as described herein. In some embodiments, the alignment module 230 may select between two or more possible portions of audio (such as overlapping portions) based on such confidence scores. Particular alignment examples are described below.

In various embodiments, the arrangement 200 may also include a training module 240 which may be configured to train the ASR 250 based on portions of audio and associated captions. In various embodiments, the training module 240 may be configured to perform such training selectively, such as according to the training value provided by a particular pair of audio portion and caption. In various embodiments, this selective training may be facilitated by use of the ASR 250 itself. For example, the training module may request recognition of a particular portion of audio by the ASR 250. The resulting text may be compared to the text of the caption to determine if there is an error and, if so, how large the error is. In various embodiments, if this error is too small (meaning the ASR 250 is already well trained for that portion of audio) or too large (meaning it may be difficult to ever train the ASR 250 to perform well for that portion of audio), then the portion of audio and associated caption may be excluded from training Particular training examples are described below.

Figure 3:
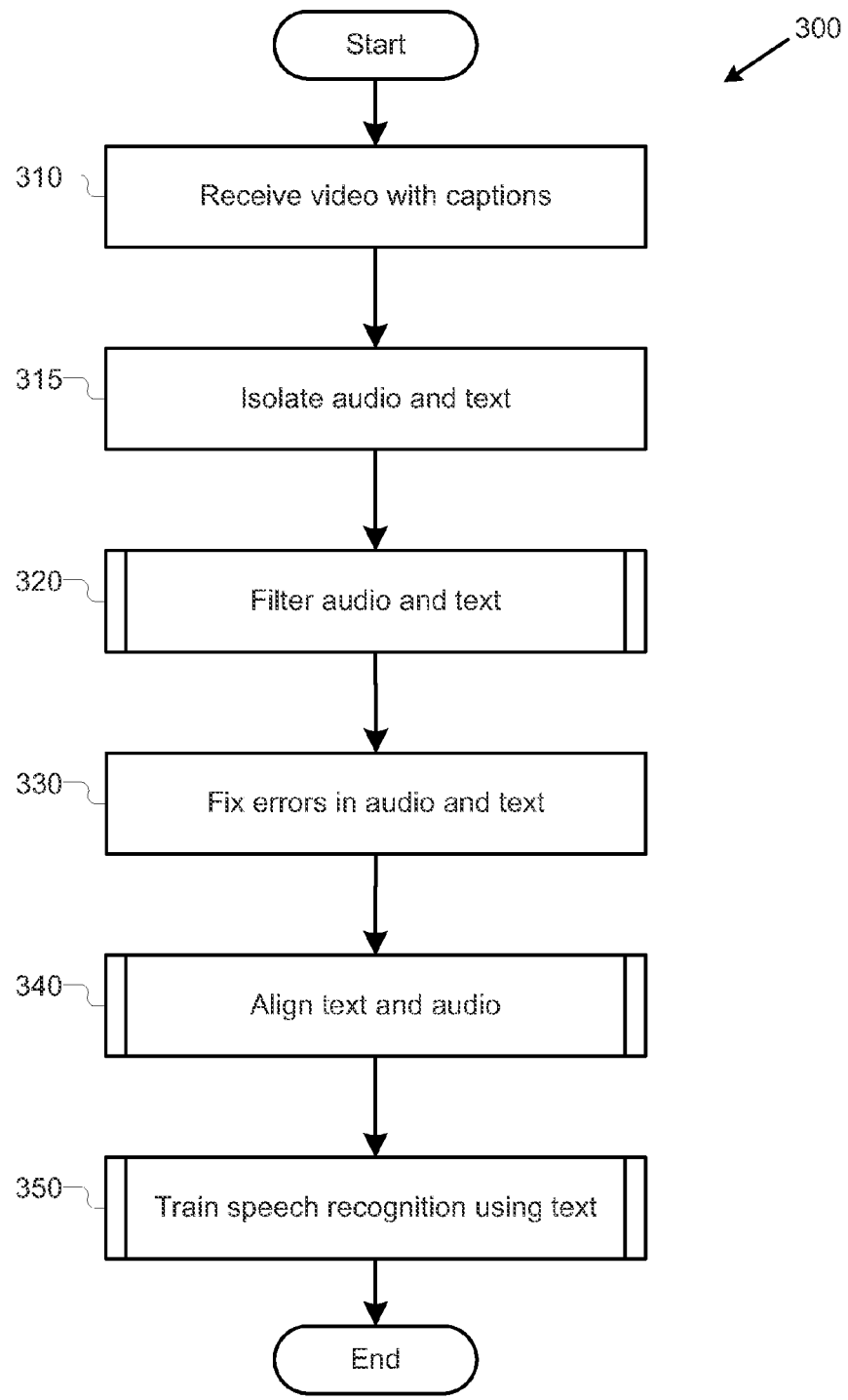
FIG. 3 illustrates an example process for training an adaptive speech recognition system utilizing captioned video, in accordance with various embodiments.

Referring now to FIG. 3, an example process 300 for training an adaptive speech recognition system utilizing captioned video is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by one or more entities illustrated in FIG. 2.

The process may begin at operation 310, where video 205 with captions 206 may be received. In various embodiments, the video 205 may be specifically selected to be used for training the ASR 250, while in other embodiments, the video 205 may be less discriminately selected, such as by capturing broadcast or cable-transmitted video. Next, at operation 315, audio and caption text maybe isolated from the video 205, such as to be used in subsequent filtering, fixing, aligning, and training processes. In various embodiments, audio may be isolated by being identified as on a channel associated with speech audio. At operation 320, one or more filters, such as filters 210-215 may filter the isolated audio and text. Particular implementations of operation 320 may be described below with reference to process 400 of FIG. 4.

Next, at operation 330, the error fixing module 220 may fix errors in the audio and or caption text. As discussed above, at operation 330, the error fixing module 220 may correct errors in the caption text, such as misspellings, omissions, insertions of erroneous characters, etc. In various embodiments, errors may be detected by checking words in the caption text against one or more dictionaries. In various embodiments, for words that are not found in a dictionary, errors may still be corrected. In some embodiments, the error fixing module may perform a lexical matching process to find dictionary words that are close typographical matches to the unknown word. These dictionary words may be compared to the potentially incorrect word and scores may be determined that represent how close these dictionary words are to the unknown word.

In various embodiments, the error fixing module may also perform a phonetic matching process to identify a sequence of phonemes from the unknown word. These phonemes may be identified using grapheme to phoneme conversion techniques, which may allow the error fixing module 220 to map the unknown word to one or more words in a dictionary that are believed to sound like the unknown word. In various embodiments, the error fixing module 220 may also use a language model to determine if words that were determined based on the previously discussed lexical and phonetic matches make linguistic sense in a given context.

In various embodiments, the error fixing module may then determine a likely word based on a weighted average of scores from the lexical matching, phonetic matching, and language model determinations. In some embodiments, the error fixing module 220 may modify audio, such as to remove noise or other sounds that may interfere with training.

Next, at operation 340, the alignment module 230 may determine alignments for various combinations of portions of audio and caption text. Particular implementations of operation 340 may be described below with reference to process 500 of FIG. 5. Next, at operation 350, the training module 240 may train the ASR 250 using the aligned portions of audio and caption text. Particular implementations of operation 350 may be described below with reference to process 600 of FIG. 6. After training, the process may then end.

Figure 4:
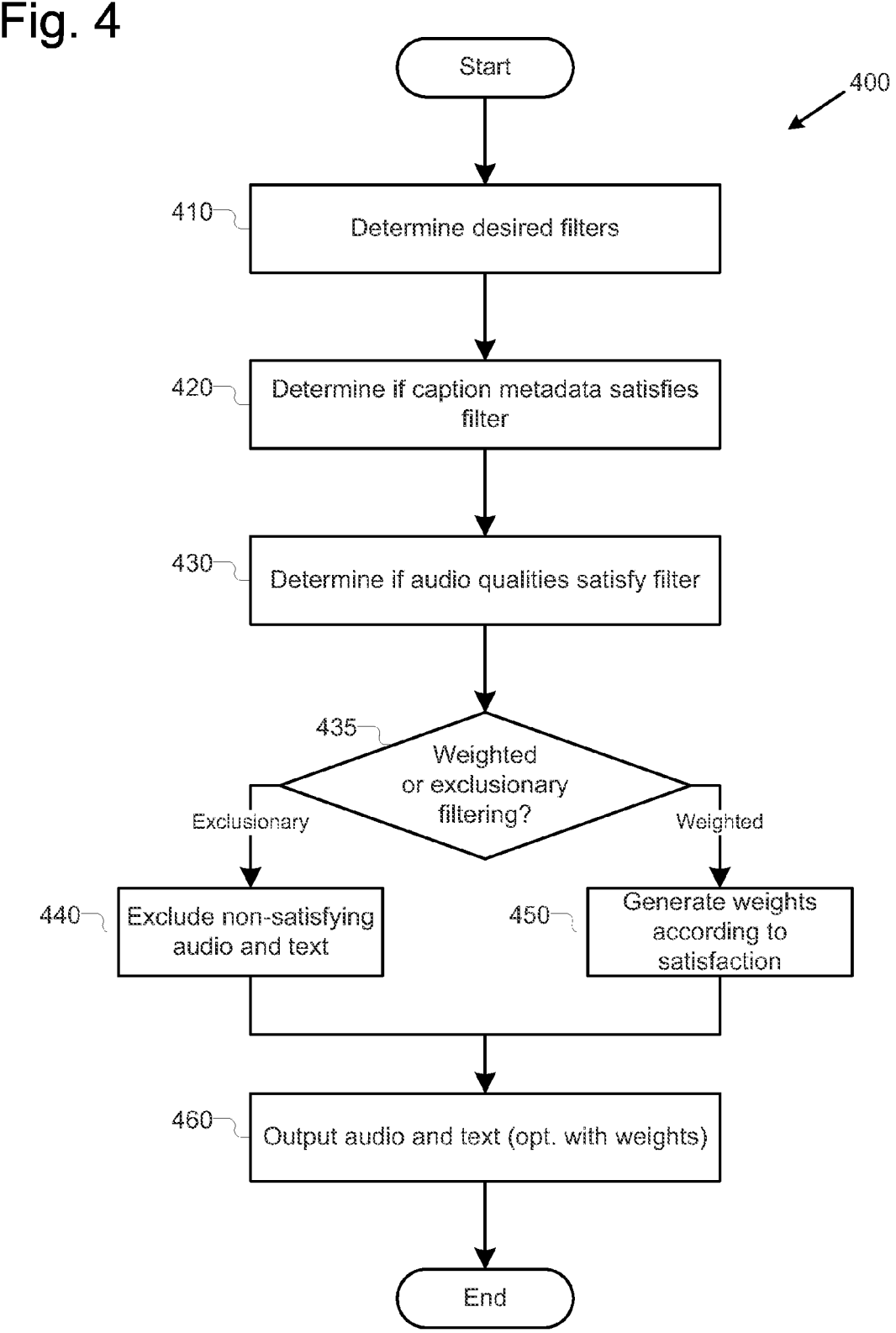
FIG. 4 illustrates an example process for filtering audio and text prior to training a speech recognition system, in accordance with various embodiments.

Referring now to FIG. 4, an example process 400 for filtering audio and text prior to training speech recognition is illustrated in accordance with various embodiments. While FIG. 4 illustrates particular example operations for process 400, in various embodiments, process 400 may include additional operations, omit illustrated operations, and/or combine illustrated operations. Process 400 may include implementations of operation 320 of process 300 of FIG. 4. In various embodiments, aspects of process 400 may be performed by filters, such as filters 210-213 illustrated in FIG. 2.

The process may begin at operation 410, where a user or other entity may determine one or more desired filters for to be used during the training process. In various embodiments, the filters selected at operation 410 may be selected such that the ASR 250 may be trained for specific environments or to be used with user of specific demographics. Thus, if an ASR 250 is to be trained to recognize children's speech, a children's speech filter (such as age filter 210) may be selected at operation 410. Next, at 420, the filter(s) 210-215 may determine if caption metadata for the captions 206 of the video 205 satisfy the filter. For instance, if a character is known to speak a particular caption and that character is known to not satisfy a filter criterion of one or more filters 210-215, then at operation 420, the filter(s) 210-215 may determine that the caption should be filtered out.

Similarly, at operation 430, the filter(s) 210-215 may determine whether audio from the video 205 satisfies the filter criteria. For example, if an ASR 250 is to be trained to recognize children's speech, at operation 430, the age filter 210 may filter out audio in frequencies that are not associated with children's speech.

Next, at decision operation 435, the filter(s) 210-215 may perform different actions based on whether the filter(s) 210-215 are used for weighted or exclusionary filtering. In exclusionary filtering, audio and text that does not satisfy one or more filter criteria may be excluded entirely from being used for training at operation 440. By contrast, if weighted filtering is to be used, then audio and text that do not satisfy one or more filter criteria may still be used, but may have a weight applied to them that lowers their influence over the training of the ASR 250. Thus, at operation 450, the filter(s) 210-215 may generate weights for the audio and text based on their satisfaction of the filter criteria. In either event, at operation 460, the filter(s) 210-215 may then output the filtered audio and text (along with weights if weights were generated). The process may then end.

Figure 5:
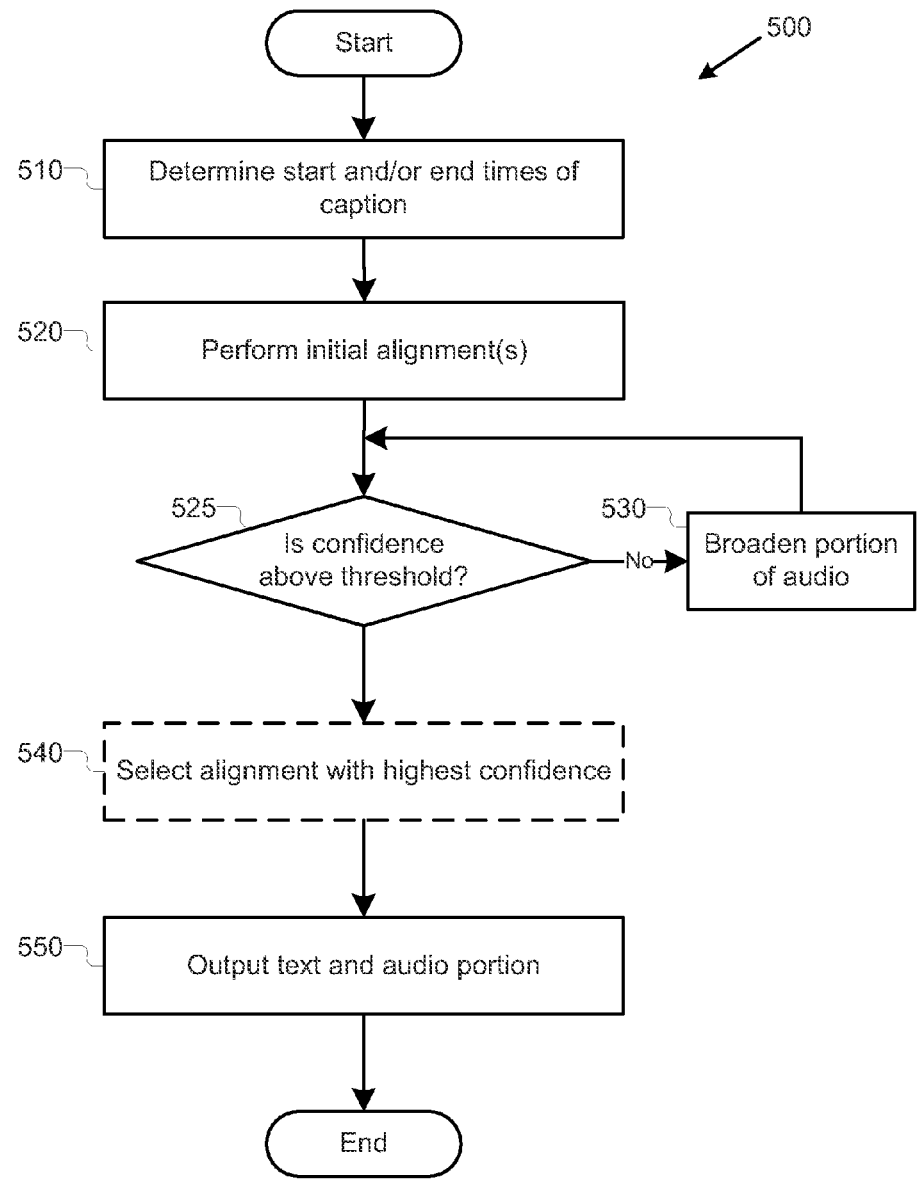
FIG. 5 illustrates an example process for determining alignments for audio and captions, in accordance with various embodiments.

Referring now to FIG. 5, an example process 500 for determining alignments for audio and captions is illustrated in accordance with various embodiments. While FIG. 5 illustrates particular example operations for process 500, in various embodiments, process 500 may include additional operations, omit illustrated operations, and/or combine illustrated operations. Process 500 may include implementations of operation 340 of process 300 of FIG. 3. In various embodiments, aspects of process 500 may be performed by the alignment module 230 illustrated in FIG. 2.

The process may begin at operation 510, where the alignment module 230 may determine initial start and end/or times of a caption. In various embodiments, one or both of these start and end times may be included with the caption. Next, at operation 520, the alignment module 230 may perform an initial alignment. In various embodiments, the alignment module, at operation 520, may select start and end time for a portion of audio that match the start and end times from the caption. In other embodiments, the initial alignment may include different start and end times for the portion of audio, such as, for example, start and end times of actual spoken audio that is contemporaneous with the caption.

Next, at decision operation 525, the alignment module may determine a confidence value for the alignment and determine if it exceeds a pre-determined confidence threshold. In various embodiments, the confidence value for the alignment may be computed using known techniques, such as forced alignment. If the confidence value does not exceed the pre-determined confidence threshold, then at operation 530, the alignment module 230 may broaden the portion of audio, such as by moving the start time earlier or the end time later, or both. The process may then repeat by returning to decision operation 525.

If, however, the confidence value is above the threshold, then at operation 540, the alignment module may determine if there are multiple overlapping portions of audio related to a caption. If so, the alignment defining the portion of audio with the highest confidence may be selected at operation 540. If there are not multiple overlapping portions of audio, then operation 540 may not be performed. Next, at operation 550, the caption text and aligned portion of audio may be output to be used for training. The process may then end.

In various embodiments, an alternative alignment determination process may be performed. In some such embodiments, it may be recognized a mismatch between start and end times and associated speech is unlikely to be more than a fixed number of captions. For example, if audio is only off of its associated caption by one caption display in either direction, that characteristic may be used to shorten the matching process. Thus, in some embodiments, a sliding window approach may be use in which three sets of captions are concatenated; along with corresponding audio. In some embodiments, this larger text window may be aligned with audio using forced alignment, and the corrected start and end times are used for the middle caption of the concatenated portion. This process may then be repeated by shifting the "window" of three captions by one caption later in time. In various embodiments the window length (e.g., number of captions) may be changed as necessary.

Figure 6:
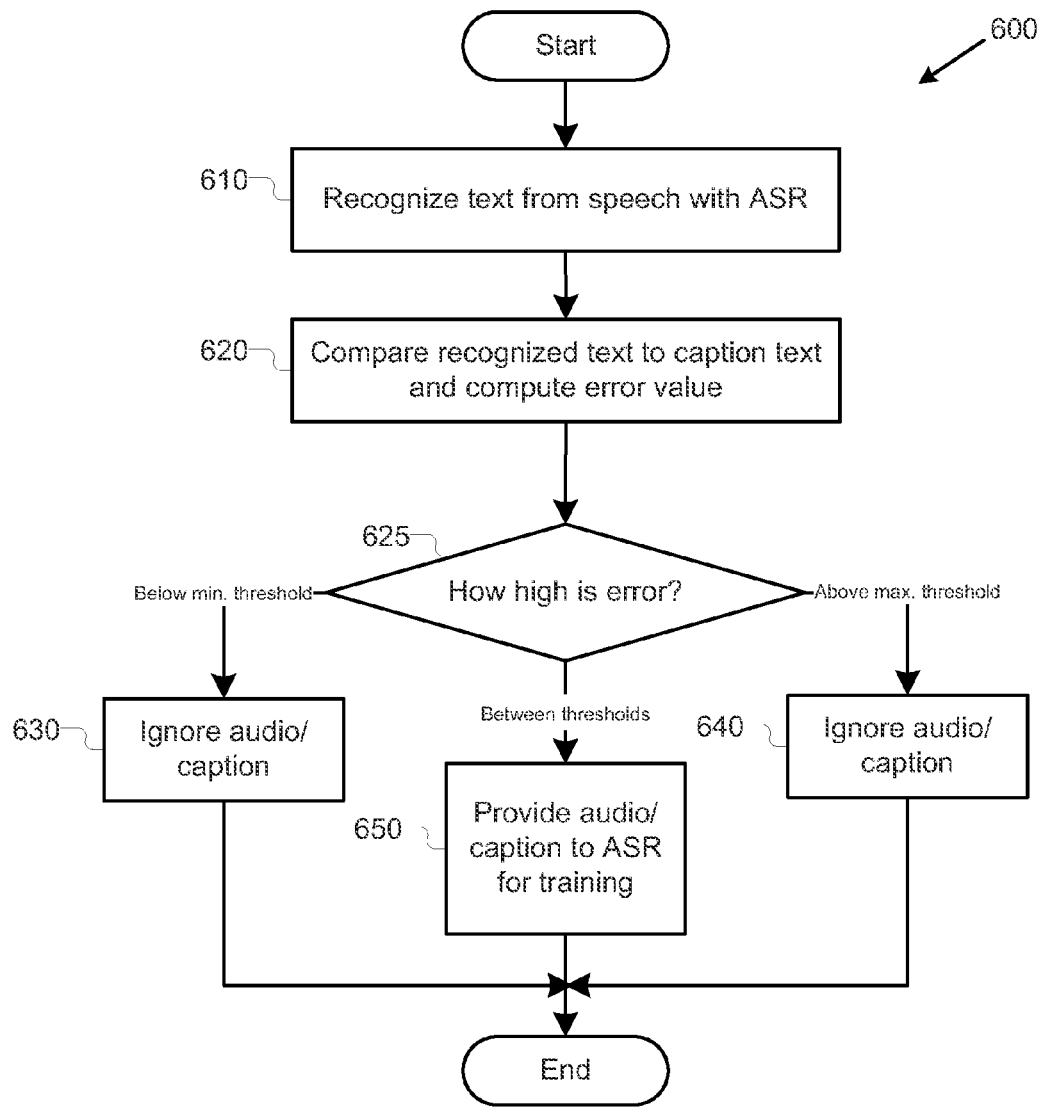
FIG. 6 illustrates an example process for training a speech recognition system using aligned caption text and audio, in accordance with various embodiments.

Referring now to FIG. 6, an example process 600 for training a speech recognition system using aligned caption text and audio is illustrated in accordance with various embodiments. While FIG. 6 illustrates particular example operations for process 600, in various embodiments, process 600 may include additional operations, omit illustrated operations, and/or combine illustrated operations. Process 600 may include implementations of operation 350 of process 300 of FIG. 3. In various embodiments, aspects of process 600 may be performed by the training module 240 illustrated in FIG. 2.

The process may begin at operation 610, where the training module 240 may cause the ASR 250 to recognize text from the speech in the portion of audio. Next, at operation 620, that recognized text may be compared, by the training module 240, to the caption text and an error value computed. In various embodiments, the error value may be computed according to known techniques. Next, at decision operation 625, the training module 240 may perform different operations depending on the error value. In various embodiments, the error value may be compared to a minimum error threshold and/or a maximum error threshold. Thus, if the error value is below a minimum error threshold, it may be determined that the ASR 250 is already well trained on for the particular portion of audio and may not benefit from additional training with this portion. Thus, at operation 630, the audio and caption text may be ignored by the training module 240. Similarly, if the error value is above the maximum threshold, it may be determined that the ASR 250 may not be easily trained for that particular portion of audio, or that the audio is of too low quality. In this case, at operation 640, the audio and caption text may again be ignored by the training module 240. However, in various embodiments, if the error value falls between the two thresholds, then at operation 650, the training module 240 may provide the audio and caption text to the ASR 250 for training. In various embodiments, this training may be moderated according to one or more weights applied by the filters, such as filters 210-215. The process may then end.

Figure 7:
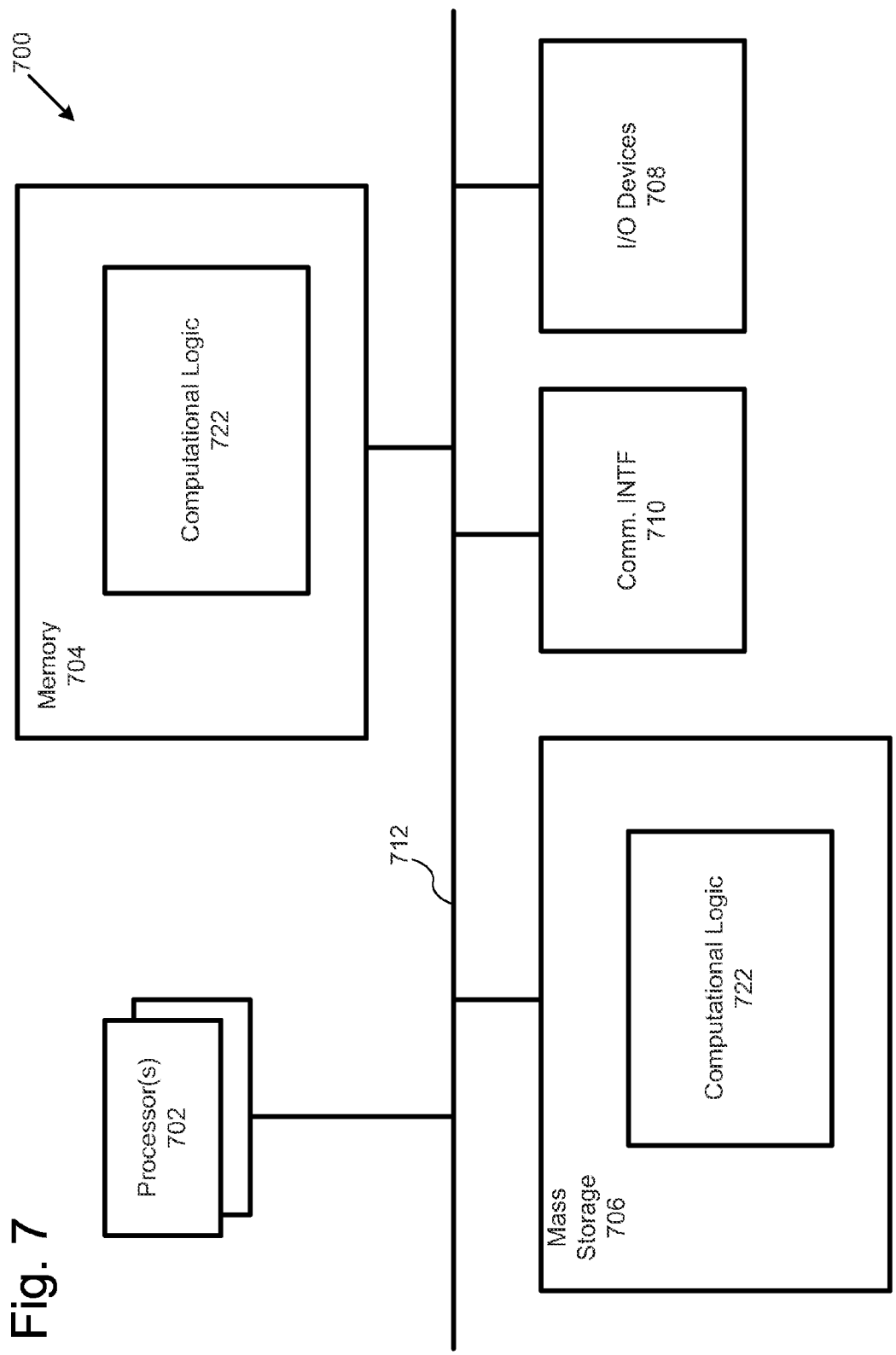
FIG. 7 illustrates an example computing environment suitable for practicing various aspects of the present disclosure, in accordance with various embodiments.

Referring now to FIG. 7, an example computer suitable for practicing various aspects of the present disclosure, including processes of FIGS. 3-6, is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth®), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with content consumption device 108, e.g., operations associated with camera control such as shown in FIGS. 3-6. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as a content aggregator/distributor server 104 or a content consumption device 108 (e.g., a player 122). Their constitutions are otherwise known, and accordingly will not be further described.

Figure 8:
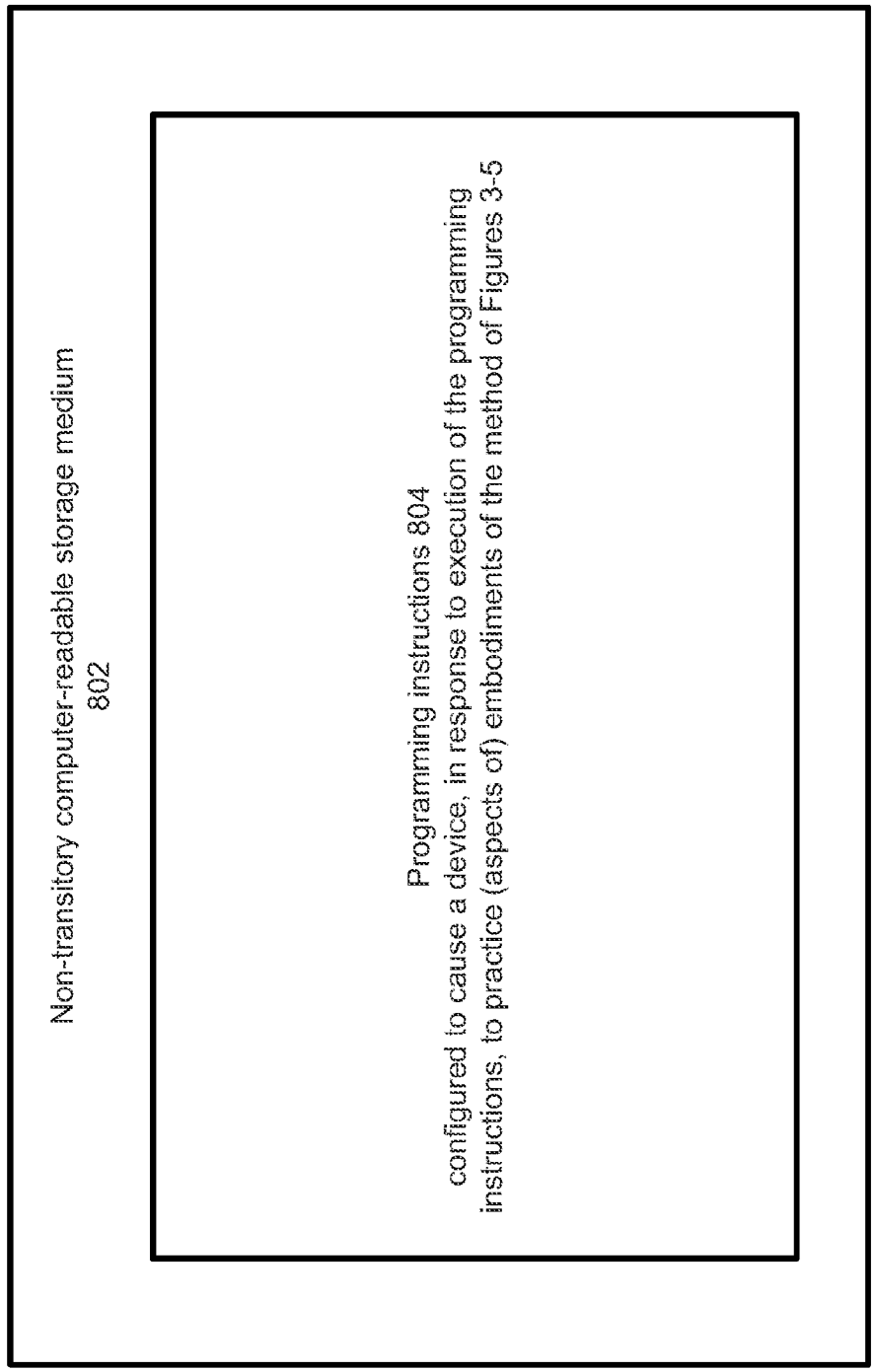
FIG. 8 illustrates an example storage medium with instructions configured to enable an apparatus to practice various aspects of the present disclosure, in accordance with various embodiments.

FIG. 8 illustrates an example of least one computer-readable storage medium 802 having instructions configured to practice all or selected ones of the operations associated with content consumption device 108, e.g., operations associated with speech recognition, earlier described, in accordance with various embodiments. As illustrated, at least one computer-readable storage medium 802 may include a number of programming instructions 804. Programming instructions 804 may be configured to enable a device, e.g., computer 700, in response to execution of the programming instructions, to perform, e.g., various operations of processes of FIGS. 2, 4, and 6, e.g., but not limited to, to the various operations performed to perform determination of frame alignments. In alternate embodiments, programming instructions 804 may be disposed on multiple at least one computer-readable storage media 802 instead.

Referring back to FIG. 7, for one embodiment, at least one of processors 702 may be packaged together with computational logic 722 configured to practice aspects of processes of FIGS. 3-6. For one embodiment, at least one of processors 702 may be packaged together with computational logic 722 configured to practice aspects of processes of FIGS. 3-6 to form a System in Package (SiP). For one embodiment, at least one of processors 702 may be integrated on the same die with computational logic 722 configured to practice aspects of processes of FIGS. 3-6. For one embodiment, at least one of processors 702 may be packaged together with computational logic 722 configured to practice aspects of processes of FIGS. 3-6 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include one or more computer-readable storage media including a plurality of instructions configured to cause one or more computing devices, in response to execution of the instructions by the computing device, to facilitate recognition of speech. The instructions may cause a computing device to identify, from a video content, a portion of audio associated with a caption in the video content and train a speech recognition system using the piece of audio and text from the caption.

Example 2 may include the computer-readable storage media of example 1, wherein identify a piece of audio associated with a caption includes identify a start time and end time for the portion of audio; perform a confidence determination between the portion of audio and the caption; and adjust the start time and/or the end time based at least in part on the confidence determination.

Example 3 may include the computer-readable storage media of example 2, wherein perform the confidence determination includes determine a confidence value.

Example 4 may include the computer-readable storage media of example 3, wherein adjust the start time and/or the end time includes: when the confidence value is below a pre-determined threshold, adjust the start time, end time, or both to increase the length of the portion of audio; and repeat the determine the confidence value and the adjust until the confidence value exceeds the pre-determined threshold.

Example 5 may include the computer-readable storage media of example 2, wherein adjust the start time and/or the end time includes perform a forced alignment of the caption and the portion of audio.

Example 6 may include the computer-readable storage media of example 5, wherein perform a forced alignment of the caption and the portion of audio includes perform a forced alignment over a window including multiple captions.

Example 7 may include the computer-readable storage media of example 2, wherein, identify a start time and end time includes identify a start time and/or an end time associated with the caption.

Example 8 may include the computer-readable storage media of any of examples 1-7, wherein identify a piece of spoken audio associated with a caption includes: determine confidence values for two or more different portions of audio associated with a single caption; and select a portion of audio out of the two or more different portions that is associated with a higher confidence value.

Example 9 may include the computer-readable storage media of any of examples 1-7, wherein the instructions are further configured to cause the computing device to filter audio and/or caption text prior to the train the speech recognition system.

Example 10 may include the computer-readable storage media of example 9, wherein filter audio and/or caption text includes filter audio and/or text prior to identify the portion of audio.

Example 11 may include the computer-readable storage media of example 9, wherein filter the audio and/or caption text includes filter the audio and/or caption text based on one or more filter criteria; and train the speech recognition system includes train the speech recognition system to recognize audio associated with the one or more filter criteria.

Example 12 may include the computer-readable storage media of example 11, wherein filter audio and/or caption text includes exclude audio and/or caption text that does not satisfy the one or more filter criteria.

Example 13 may include the computer-readable storage media of example 11, wherein filter audio and/or caption text includes apply weights to audio and/or caption text based on the one or more filter criteria.

Example 14 may include the computer-readable storage media of example 13, wherein train the speech recognition system includes train the speech recognition system with relation to the weights.

Example 15 may include the computer-readable storage media of any of examples 1-7, wherein train the speech recognition system includes: perform initial speech recognition on the portion of audio of obtain recognized text; compare the recognized text to the caption to determine an error value; and train the speech recognition system based at least in part on the error value.

Example 16 may include the computer-readable storage media of example 15, wherein train the speech recognition system based at least in part on the error value includes omit use of the portion of audio and the caption for training the speech process if the error is above a pre-determined maximum error threshold.

Example 17 may include the computer-readable storage media of example 15, wherein train the speech recognition system based at least in part on the error value includes omit use of the portion of audio and the caption for training the speech process if the error is below a pre-determined minimum error threshold.

Example 18 may include the computer-readable storage media of any of examples 1-7, wherein the instructions are further configured to cause the computing device to fix errors in caption and/or audio data of the video data.

Example 19 may include an apparatus for facilitating recognition of speech, the apparatus may include one or more computer processors. The apparatus may further include an alignment module configured to operate on the one or more computer processors to identify, from a video content, a portion of audio associated with a caption in the video content and a training module configured to operate on the one or more computer processors to train a speech recognition system using the piece of audio and text from the caption.

Example 20 may include the apparatus of example 19, wherein identify a piece of audio associated with a caption includes: identify a start time and end time for the portion of audio; perform a confidence determination between the portion of audio and the caption; and adjust the start time and/or the end time based at least in part on the confidence determination.

Example 21 may include the apparatus of example 20, wherein perform the confidence determination includes determine a confidence value.

Example 22 may include the apparatus of example 21, wherein adjust the start time and/or the end time includes: when the confidence value is below a pre-determined threshold, adjust the start time, end time, or both to increase the length of the portion of audio; and repeat the determine the confidence value and the adjust until the confidence value exceeds the pre-determined threshold.

Example 23 may include the apparatus of example 20, wherein adjust the start time and/or the end time includes perform a forced alignment of the caption and the portion of audio.

Example 24 may include the apparatus of example 23, wherein perform a forced alignment of the caption and the portion of audio includes perform a forced alignment over a window including multiple captions.

Example 25 may include the apparatus of example 20, wherein identify a start time and end time includes identify a start time and/or an end time associated with the caption.

Example 26 may include the apparatus of any of examples 19-25, wherein identify a piece of spoken audio associated with a caption includes: determine confidence values for two or more different portions of audio associated with a single caption; and select a portion of audio out of the two or more different portions that is associated with a higher confidence value.

Example 27 may include the apparatus of any of examples 19-25, further including one or more filter modules configured to operate on the one or more computing processors to filter audio and/or caption text prior to the train the speech recognition system.

Example 28 may include the apparatus of example 27, wherein filter audio and/or caption text includes filter audio and/or text prior to identify the portion of audio.

Example 29 may include the apparatus of example 28, wherein: filter the audio and/or caption text includes filter the audio and/or caption text based on one or more filter criteria; and train the speech recognition system includes train the speech recognition system to recognize audio associated with the one or more filter criteria.

Example 30 may include the apparatus of example 29, wherein filter audio and/or caption text includes exclude audio and/or caption text that does not satisfy the one or more filter criteria.

Example 31 may include the apparatus of example 29, wherein filter audio and/or caption text includes apply weights to audio and/or caption text based on the one or more filter criteria.

Example 32 may include the apparatus of example 31, wherein train the speech recognition system includes train the speech recognition system with relation to the weights.

Example 33 may include the apparatus of any of examples 19-25, wherein train the speech recognition system includes: perform initial speech recognition on the portion of audio of obtain recognized text; compare the recognized text to the caption to determine an error value; and train the speech recognition system based at least in part on the error value.

Example 34 may include the apparatus of example 33, wherein train the speech recognition system based at least in part on the error value includes omit use of the portion of audio and the caption for training the speech process if the error is above a pre-determined maximum error threshold.

Example 35 may include the apparatus of example 33, wherein train the speech recognition system based at least in part on the error value includes omit use of the portion of audio and the caption for training the speech process if the error is below a pre-determined minimum error threshold.

Example 36 figured to operate on the one or more computer processors to fix errors in caption and/or audio data of the video data.

Example 37 may include a computer-implemented method for facilitating recognition of speech, the method including: identifying, by a computing device, from a video content, a portion of audio associated with a caption in the video content; and training, by the computing device, a speech recognition system using the piece of audio and text from the caption.

Example 38 may include the method of example 37, wherein identifying a piece of audio associated with a caption includes: identifying a start time and end time for the portion of audio; performing a confidence determination between the portion of audio and the caption; and adjusting the start time and/or the end time based at least in part on the confidence determination.

Example 39 may include the method of example 38, wherein performing the confidence determination includes determining a confidence value.

Example 40 may include the method of example 39, wherein adjusting the start time and/or the end time includes: when the confidence value is below a pre-determined threshold, adjusting the start time, end time, or both to increase the length of the portion of audio; and repeating the determining the confidence value and the adjusting until the confidence value exceeds the pre-determined threshold.

Example 41 may include the method of example 38, wherein adjusting the start time and/or the end time includes performing a forced alignment of the caption and the portion of audio.

Example 42 may include the method of example 41, wherein performing a forced alignment of the caption and the portion of audio includes performing a forced alignment over a window including multiple captions.

Example 43 may include the method of example 38, wherein, identifying a start time and end time includes identifying a start time and/or an end time associated with the caption.

Example 44 may include the method of any of examples 37-43, wherein identifying a piece of spoken audio associated with a caption includes: determining confidence values for two or more different portions of audio associated with a single caption; and selecting a portion of audio out of the two or more different portions that is associated with a higher confidence value.

Example 45 may include the method of any of examples 37-43, further including filtering, by the computing device, audio and/or caption text prior to the train the speech recognition system.

Example 46 may include the method of example 45, wherein filtering audio and/or caption text includes filtering audio and/or text prior to identify the portion of audio.

Example 47 may include the method of example 45, wherein: filtering the audio and/or caption text includes filtering the audio and/or caption text based on one or more filter criteria; and training the speech recognition system includes training the speech recognition system to recognize audio associated with the one or more filter criteria.

Example 48 may include the method of example 47, wherein filtering audio and/or caption text includes excluding audio and/or caption text that does not satisfy the one or more filter criteria.

Example 49 may include the method of example 47, wherein filtering audio and/or caption text includes applying weights to audio and/or caption text based on the one or more filter criteria.

Example 50 may include the method of example 49, wherein training the speech recognition system includes training the speech recognition system with relation to the weights.

Example 51 may include the method of any of examples 37-43, wherein training the speech recognition system includes: performing initial speech recognition on the portion of audio of obtain recognized text; comparing the recognized text to the caption to determine an error value; and training the speech recognition system based at least in part on the error value.

Example 52 may include the method of example 51, wherein training the speech recognition system based at least in part on the error value includes omitting use of the portion of audio and the caption for training the speech process if the error is above a pre-determined maximum error threshold.

Example 53 may include the method of example 51, wherein training the speech recognition system based at least in part on the error value includes omitting use of the portion of audio and the caption for training the speech process if the error is below a pre-determined minimum error threshold.

Example 54 may include the method of any of examples 37-43, further including fixing, by the computing device, errors in caption and/or audio data of the video data.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
a memory configured to store instructions; and
a processor configured to execute the instructions to:
receive multimedia content, wherein the multimedia content include video, audio, and captions, wherein the captions identify a textual representation of the audio, and wherein the multimedia content relates to dialog by a first speaker and a second speaker;
perform image processing on the video to identify an age group of the first speaker and a gender of the first speaker, wherein the second speaker is not associated with at least one of the age group or the gender;
determine, based on the image processing, a first portion of the video presenting a first portion of the dialog by the first speaker and a second portion of the video presenting a second portion of the dialog by the second speaker, wherein a first portion of the captions is associated with the first portion of the dialog and a second portion of the captions is associated with the second portion of the dialog;

identify a first portion of the audio associated with the first portion of the video, and a second portion of the audio associated with the second portion of the video;

filter the multimedia content to extract the first portion of the audio and the first portion of the captions and to remove the second portion of the audio and the second portion of the captions; and train an adaptive speech recognition system (ASR) with respect to the age group of the first speaker and the gender of the first speaker, wherein the processor, when training the ASR with respect to the age group of the first speaker and the gender of the first speaker, is further configured to:

use the untrained ASR to perform a speech-to-text conversion of the first portion of the audio;

calculate an error value based on comparing the first portion of the captions and results from the speech-to-text conversion using the untrained ASR; and use the first portion of the audio and the first portion of the captions to train the ASR when the error value is between a first threshold and a second threshold that is greater than the first threshold, wherein the first portion of the audio and the first portion of the captions are not used to train the ASR with respect to the age group and the gender of the first speaker when the error value is below the first threshold or greater than the second threshold.

2. The apparatus of claim 1, wherein the processor, when filtering the multimedia content to extract the first portion of the audio and the first portion of the captions, is further configured to:

identify a start time and an end time for the first portion of the audio;

perform a confidence determination between the first portion of the audio and the first portion of the captions; and adjust at least one of the start time or the end time based at least in part on the confidence determination.

3. The apparatus of claim 2, wherein the processor, when performing the confidence determination between the first portion of the audio and the first portion of the captions, is further configured to:

determine a confidence value associated with an alignment between the first portion of the audio and the first portion of the captions, and wherein the processor, when adjusting the at least one of the start time or the end time based at least in part on the confidence determination, is further configured to:

determine whether the confidence value satisfies a confidence threshold; and adjust the at least one of the start time or the end time when the confidence value does not satisfy the confidence threshold.

4. The apparatus of claim 1, wherein the dialog by the first speaker and the second speaker relates to an environment associated with an attribute, and wherein the processor, when training the ASR, is further configured to:

filter the multimedia content to remove at least one of a part of the audio or a part of the captions associated with another environment, wherein the other environment is not associated with the attribute of the environment; and train the ASR further with respect to the attribute of the environment using the filtered multimedia content that excludes the at least one of the part of the audio or the part of the captions associated with the other environment.

5. The apparatus of claim 4, wherein the attribute of the environment comprises at least one of a background noise level or a type of location associated with the environment.

6. The apparatus of claim 1, wherein multimedia content further relates to dialog by a third speaker, and wherein the processor, when training the ASR, is further configured to:

identify an accent associated with the first speaker, wherein the accent is not associated with the third speaker;

identify a third portion of the audio associated with the third speaker, wherein the third portion of the audio is associated with a third portion of the captions;

filter the multimedia content to remove the third portion of the audio and the third portion of the captions; and train the ASR further with respect to the accent using the filtered multimedia content that excludes the third portion of the audio and the third portion of the captions.

7. The apparatus of claim 1, wherein the processor, when training the ASR, is further configured to:

perform initial speech recognition on the first portion of the audio to obtain recognized text;

compare the recognized text and the first portion of the captions to determine an error value; and train the ASR based at least in part on the error value.

8. The apparatus of claim 1, wherein the processor, when identifying the first portion of the audio and the first portion of the captions, is further configured to:

determine a first confidence value associated with an alignment between a first part of the audio associated with the first speaker and a corresponding first part of the captions;

determine a second confidence value associated with an alignment between a second part of the audio associated with the first speaker and a corresponding second part of the captions; and select, as the first portion of the audio to be used for training the ASR with respect to the age group and the gender of the first speaker, the first part of the audio or the second part of the audio based on a comparison of the first confidence value and the second confidence value.

9. The apparatus of claim 1, wherein the processor is further configured to:

perform image processing on the video to identify an age group of the second speaker and a gender of the second speaker;

assign a first weight to the first portion of the audio;

assign a second weight to the second portion of the audio, the second weight being larger than the first weight; and train the ASR with respect to the age group and the gender of the second speaker based on the weighted first portion of the audio, the weighted second portion of the audio, and the first and second portions of the captions.

10. The apparatus of claim 1, wherein the content includes a movie, a television program, or user-created content.

11. A method comprising:

receiving, by a processor, multimedia content, wherein the multimedia content include video, audio, and captions, wherein the captions identify a textual representation of the audio, and wherein the multimedia content relates to dialog by a first speaker and a second speaker;

performing, by the processor, image processing on the video to identify an age group of the first speaker and a gender of the first speaker, wherein the second speaker is not associated with at least one of the age group or the gender;

determining, by the processor and based on the image processing, a first portion of the video presenting a first portion of the dialog by the first speaker and a second portion of the video presenting a second portion of the dialog by the second speaker, wherein a first portion of the captions is associated with the first portion of the dialog and a second portion of the captions is associated with the second portion of the dialog;

identifying, by the processor, a first portion of the audio associated with the first portion of the video, and a second portion of the audio associated with the second portion of the video;

filtering, by the processor, the multimedia content to extract the first portion of the audio and the first portion of the captions and to remove the second portion of the audio and the second portion of the captions, wherein filtering the multimedia content includes:
  determining a confidence value associated with an alignment between the first portion of the audio and the first portion of the captions;
  determining whether the confidence value satisfies a confidence threshold; and
  adjusting, when the confidence value does not satisfy the confidence threshold, at least one of at least one of a start time for the first portion of the audio or the end time for the first portion of the audio; and training, by the processor, an adaptive speech recognition system (ASR) with respect to the age group of the first speaker and the gender of the first speaker using the first portion of the audio and the first portion of the captions, wherein training the ASR with respect to the age group and the gender of the first speaker further includes:
  using the untrained ASR to perform a speech-to-text conversion of the first portion of the audio;
  calculating an error value based on comparing the first portion of the captions and results from the speech-to-text conversion using the untrained ASR; and
  using the first portion of the audio and the first portion of the captions to train the ASR with respect to the age group and the gender of the first speaker when the error value is between a first threshold and a second threshold, wherein the first threshold is greater than the second threshold, and wherein the first portion of the audio and the first portion of the captions are not used to train the ASR with respect to the age group and the gender of the first speaker when the error value is above the first threshold or below than the second threshold.

12. The method of claim 1, wherein the dialog by the first speaker and the second speaker relates to an environment associated with an attribute, and wherein training the ASR further includes:
  filtering the multimedia content to remove at least one of a part of the audio or a part of the captions associated with another environment, wherein the other environment is not associated with the attribute of the environment; and
  training the ASR further with respect to the attribute of the environment using the filtered multimedia content that excludes the at least one of the part of the audio or the part of the captions associated with the other environment.

13. The method of claim 12, wherein the attribute of the environment comprises at least one of a background noise level or a type of location associated with the environment.

14. The method of claim 11, wherein multimedia content further relates to dialog by a third speaker, and wherein training the ASR further includes:
  identifying an accent associated with the first speaker, wherein the accent is not associated with the third speaker;
  identifying a third portion of the audio associated with the third speaker, wherein the third portion of the audio is associated with a third portion of the captions;
  filtering the multimedia content to remove the third portion of the audio and the third portion of the captions; and
  training the ASR further with respect to the accent using the filtered multimedia content that excludes the third portion of the audio and the third portion of the captions.

15. The method of claim 11, wherein training the ASR further includes:
  performing initial speech recognition on the first portion of the audio to obtain recognized text;
  comparing the recognized text and the first portion of the captions to determine an error value; and
  training the ASR based at least in part on the error value.

16. The method of claim 11, wherein identifying the first portion of the audio and the first portion of the captions further includes:
  determining a first confidence value associated with an alignment between a first part of the audio associated with the first speaker and a corresponding first part of the captions;
  determining a second confidence value associated with an alignment between a second part of the audio associated with the first speaker and a corresponding second part of the captions; and
  selecting, as the first portion of the audio to be used for training the ASR with respect to the age group and the gender of the first speaker, the first part of the audio or the second part of the audio based on a comparison of the first confidence value and the second confidence value.

17. The method of claim 11, wherein the error value is above the first threshold or below than the second threshold indicates when using the first portion of the audio and the first portion of the captions to train the ASR will not improve the performance of the ASR with respect to the age group and the gender of the first speaker.

18. The method of claim 11, wherein the content includes a movie, a television program, or user-created content.

19. A non-transitory computer-readable medium to store instructions, the instructions comprising:
  one or more instructions that, when executed by a processor, cause the processor to:
    receive multimedia content that includes video, audio, and captions identifying a textual representation of the audio, wherein the multimedia content relates to dialog by a first speaker and a second speaker;
    perform image processing on the video to identify an age group of the first speaker and a gender of the first speaker, wherein the second speaker is not associated with at least one of the age group or the gender;
    determine, based on the image processing, a first portion of the video presenting a first portion of the dialog by the first speaker and a second portion of the video presenting a second portion of the dialog by the second speaker, wherein a first portion of the captions is associated with the first portion of the dialog and a second portion of the captions is associated with the second portion of the dialog;
    identify a first portion of the audio associated with the first portion of the video, and a second portion of the audio associated with the second portion of the video, wherein the one or more instructions further cause the processor, when identifying the portion of audio associated with the captions of the video, to:
- determine a first confidence value associated with an alignment between a first part of the audio associated with the first speaker and a corresponding first part of the captions;
- determine a second confidence value associated with an alignment between a second part of the audio associated with the first speaker and a corresponding second part of the captions; and
- select, as the first portion of the audio to be used for training the ASR with respect to the age group and the gender of the first speaker, the first part of the audio or the second part of the audio based on a comparison of the first confidence value and the second confidence value;

filter the multimedia content to extract the first portion of the audio and the first portion of the captions and to remove the second portion of the audio and the second portion of the captions; and train an adaptive speech recognition system (ASR) with respect to the age group of the first speaker and the gender of the first speaker using the first portion of the audio and the first portion of the captions, wherein the one or more instructions further cause the processor, when training the ASR, to:
- use the untrained ASR to perform a speech-to-text conversion of the first portion of the audio;
- calculate an error value based on comparing the first portion of the captions and results from the speech-to-text conversion using the untrained ASR; and
- use the first portion of the audio and the first portion of the captions to train the ASR with respect to the age group and the gender of the first speaker when the error value is between a first threshold and a second threshold, wherein the first threshold is greater than the second threshold, and wherein the first portion of the audio and the first portion of the captions are not used to train the ASR with respect to the age group and the gender of the first speaker when the error value is above the first threshold or below than the second threshold.

20. The non-transitory computer-readable medium of claim 19, wherein the one or more instructions, when causing the processor to filter the multimedia content to extract the first portion of the audio and the first portion of the captions, further cause the processor to:
- identify a start time and an end time for the first portion of the audio;
- perform a confidence determination between the first portion of the audio and the first portion of the captions; and
- adjust at least one of the start time or the end time based at least in part on the confidence determination.

21. The non-transitory computer-readable medium of claim 20, wherein the one or more instruction further cause the processor, when performing the confidence determination between the first portion of the audio and the first portion of the captions, to:
- determine a confidence value associated with an alignment between the first portion of the audio and the first portion of the captions, and wherein the one or more instruction further cause the processor, when adjusting the at least one of the start time or the end time based at least in part on the confidence determination, to:
- determine whether the confidence value satisfies a confidence threshold; and
- adjust the at least one of the start time or the end time when the confidence value does not satisfy the confidence threshold, wherein the at least one of the start time or the end time are not adjusted when the confidence value satisfies the confidence threshold.

22. The non-transitory computer-readable medium of claim 19, wherein multimedia content further relates to dialog by a third speaker, and wherein the one or more instructions further cause the processor, when training the ASR, to:
- identify an accent associated with the first speaker, wherein the accent is not associated with the third speaker;
- identify a third portion of the audio associated with the third speaker, wherein the third portion of the audio is associated with a third portion of the captions;
- filter the multimedia content to remove the third portion of the audio and the third portion of the captions; and
- train the ASR further with respect to the accent using the filtered multimedia content that excludes the third portion of the audio and the third portion of the captions.

23. The non-transitory computer-readable medium of claim 19, wherein the one or more instructions further cause the processor, when training the ASR, to:
- perform initial speech recognition on the first portion of the audio to obtain recognized text;
- compare the recognized text and the first portion of the captions to determine an error value; and
- train the ASR based at least in part on the error value.

24. The non-transitory computer-readable medium of claim 19, wherein the first portion of the dialog by a first speaker and a second speaker occurs in an environment, wherein the environment is associated with an attribute, and wherein the one or more instructions further cause the processor, when training the ASR, to:
- filter the multimedia content to remove at least one of a part of the audio or a part of the captions associated with another environment, wherein the other environment is not associated with the attribute of the environment; and
- train the ASR further with respect to the attribute of the environment using the filtered multimedia content that excludes the at least one of the part of the audio or the part of the captions associated with the other environment.

25. The non-transitory computer-readable medium of claim 19, wherein the one or more instructions further cause the processor, when training the ASR, to:
- correct an error in at least one of the first portion of the audio or the first portion of the captions, and
- train the ASR using the corrected at least one of the first portion of the audio or the first portion of the captions.

* * * * *